(12) United States Patent
Fourney

(10) Patent No.: US 7,861,849 B2
(45) Date of Patent: Jan. 4, 2011

(54) MERGE CONVEYOR INCLUDING HIGH-FRICTION ROLLERS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 112 days.

(21) Appl. No.: 12/417,044

(22) Filed: Apr. 2, 2009

(65) Prior Publication Data

US 2010/0252398 A1 Oct. 7, 2010

(51) Int. Cl.
*B65G 47/26* (2006.01)
*B65G 17/24* (2006.01)

(52) U.S. Cl. .................. 198/453; 198/452; 198/779
(58) Field of Classification Search ......... 198/452–455, 198/447–448, 779
See application file for complete search history.

(56) References Cited

U.S. PATENT DOCUMENTS

| | | | |
|---|---|---|---|
| 1,075,891 A | | 10/1913 | Ayars |
| 2,315,880 A | * | 4/1943 | Stiles .................. 198/454 |
| 2,560,995 A | * | 7/1951 | Stiles .................. 198/455 |
| 2,753,975 A | * | 7/1956 | Day et al. ............ 198/448 |
| 3,550,756 A | | 12/1970 | Kornylak |
| 4,623,059 A | | 11/1986 | Agnew |
| 4,669,604 A | * | 6/1987 | Lenhart ............... 198/453 |
| 5,129,504 A | | 7/1992 | Smith |
| 5,605,217 A | * | 2/1997 | Risley et al. ......... 198/453 |
| 5,664,662 A | * | 9/1997 | Wilson et al. ........ 198/453 |
| 5,937,995 A | | 8/1999 | Hartness et al. |
| 6,148,990 A | * | 11/2000 | Lapeyre et al. ....... 198/779 |
| 6,328,151 B1 | | 12/2001 | Spangenberg et al. |
| 7,147,097 B2 | | 12/2006 | Lemm |
| 7,156,606 B2 | * | 1/2007 | Bridier et al. ........ 414/789.6 |
| 7,461,739 B2 | | 12/2008 | Fourney |
| 2008/0271978 A1 | | 11/2008 | Weiser |
| 2009/0095599 A1 | | 4/2009 | Marshall et al. |

FOREIGN PATENT DOCUMENTS

| EP | 1500616 A1 | 1/2005 |
|---|---|---|
| GB | 2255760 A | 11/1992 |

OTHER PUBLICATIONS

PCT/US10/28588, International Search Report and the Written Opinion of the International Searching Authority, mailed Jul. 9, 2010, European Patent Office, Rijswik, NL.

\* cited by examiner

*Primary Examiner*—Gene Crawford
*Assistant Examiner*—Mark A Deuble
(74) *Attorney, Agent, or Firm*—James T. Cronvich

(57) ABSTRACT

A merge conveyor comprising a timing conveyor feeding a singulating conveyor characterized by a transverse-roller conveyor belt having rollers with a high-friction peripheral surface. The timing conveyor delivers articles to the singulating conveyor one article at a time at precise intervals. The rollers in the transverse-roller belt rotate freely transverse to the conveying direction. A plow guides the timed articles received on the singulating belt into a single file. The high-friction rollers inhibit the rollers from sliding along the rollers in the conveying direction to maintain the precise timing established by the timing conveyor.

6 Claims, 4 Drawing Sheets

MERGE CONVEYOR INCLUDING HIGH-FRICTION ROLLERS

BACKGROUND

The invention relates generally to power-driven conveyors and, more particularly, to roller-belt conveyors used to merge multiple lanes of articles into a single file.

Many conveying applications require that articles traveling different paths be merged into a single file. One example of a merge conveyor is described in U.S. Pat. No. 7,426,992, "Systems and Methods for Providing an Improved Timing Conveyor," issued Sep. 23, 2008, to Matthew L. Fourney. FIG. 15 of that patent shows a timing conveyor section comprising two side-by-side timing conveyors that receive articles at irregular intervals. Each timing conveyor accelerates the articles to designated positions that are staggered from conveyor to conveyor. The staggering of the designated positions allows the two timing conveyors to alternately feed articles at regular intervals to a singulating conveyor, which merges the spaced articles into a single file.

One typical singulating conveyor includes a flat-top belt with a plow, or guide, arranged across the belt to merge the articles to an exit region of the belt. Although plows are made of materials having low coefficients of friction, articles still tend to pivot at the plows and re-orient themselves or to move backward slightly upon contact. These effects can overcome the precise timing of the delivery of articles from the timing conveyor section and set lower bounds on the spacing of the delivery of articles by the timing conveyor and, consequently, upper bounds on throughput.

Another typical singulating conveyor uses an angled-roller belt to singulate articles without a plow, as described in U.S. Pat. No. 6,758,323, "Singulating Conveyor," issued Jul. 6, 2004 to Mark B. Costanzo. The singulating belt described has actuated belt rollers on each half that rotate obliquely toward the center line of the belt as it advances. The rollers are plastic with a fairly low coefficient of friction and ride on actuating rollers or bearing surfaces in the carryway. Slip between the rollers and the conveyed articles can compromise the precise article timing set by the timing conveyor. These angled-roller belt singulators are more expensive than flat-top belts with plows and typically require a longer distance to singulate articles.

Thus, there is a need for a simple merge conveyor that can accommodate high throughput.

SUMMARY

One version of a merge conveyor embodying features of the invention comprises a multilane timing conveyor feeding articles off its downstream end at different times to a conveyor belt having article-supporting rollers arranged to rotate freely in a direction transverse to a conveying direction. The timing conveyor staggers the articles in the conveying direction from lane to lane to feed them one lane at a time to the conveyor belt. A plow is arranged with the conveyor belt to funnel articles through a narrowing-width region of the conveyor belt to its exit end. The rollers in the conveyor belt have high-friction peripheral surfaces contacting the conveyed articles to resist movement of the articles along the rollers parallel to the conveying direction. The article-supporting rollers rotate to push an article engaging the plow in a transverse direction as the conveyor belt advances.

BRIEF DESCRIPTION OF THE DRAWINGS

These features of the invention, as well as other aspects and advantages, are better understood by referring to the following description, appended claims, and accompanying drawings, in which:

DETAILED DESCRIPTION

Figure 1:
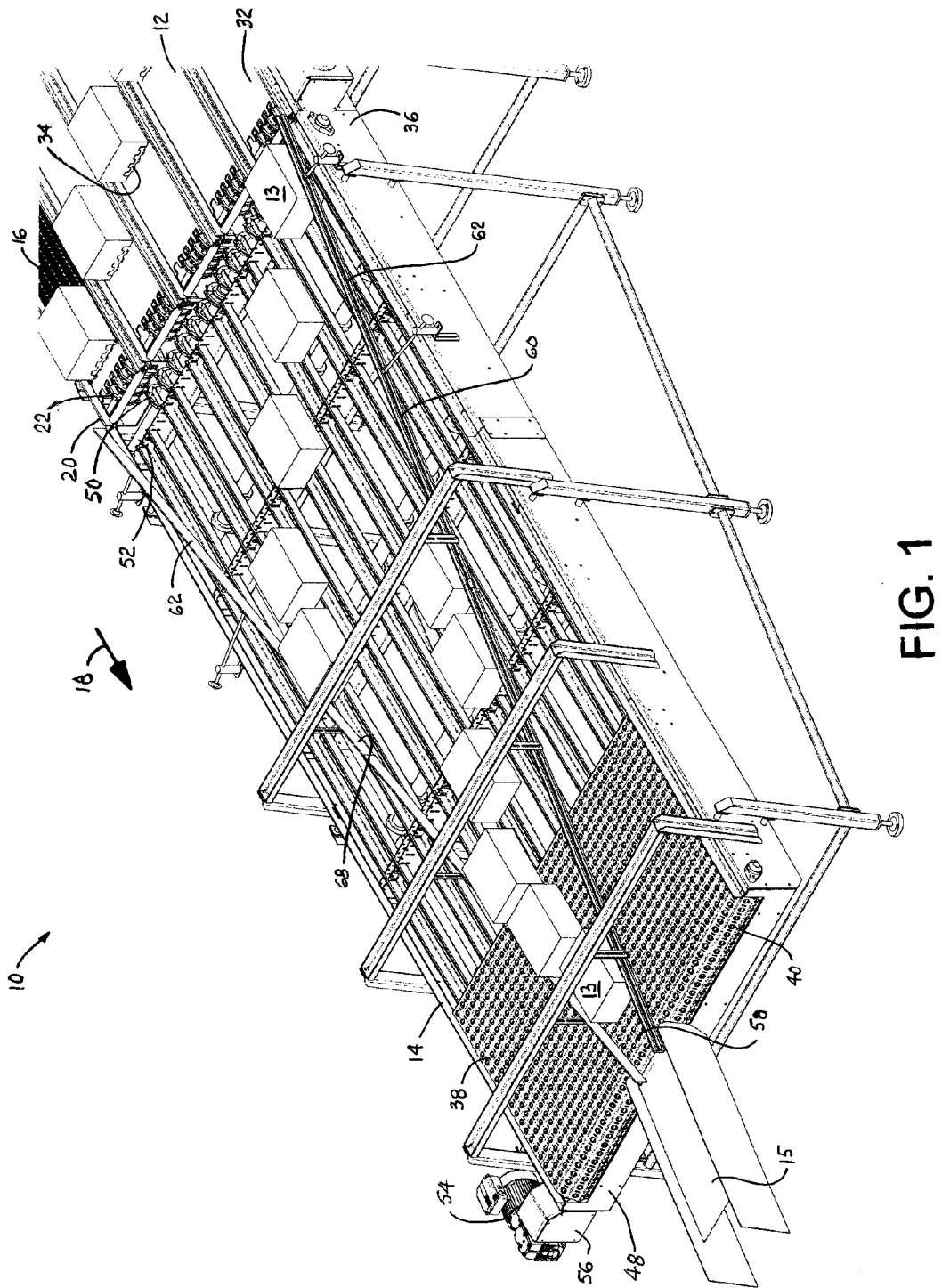
FIG. 1 is a perspective view, partly cut away, of a portion of one version of a merge conveyor embodying features of the invention, including a transverse-roller singulating belt.
Figure 2:
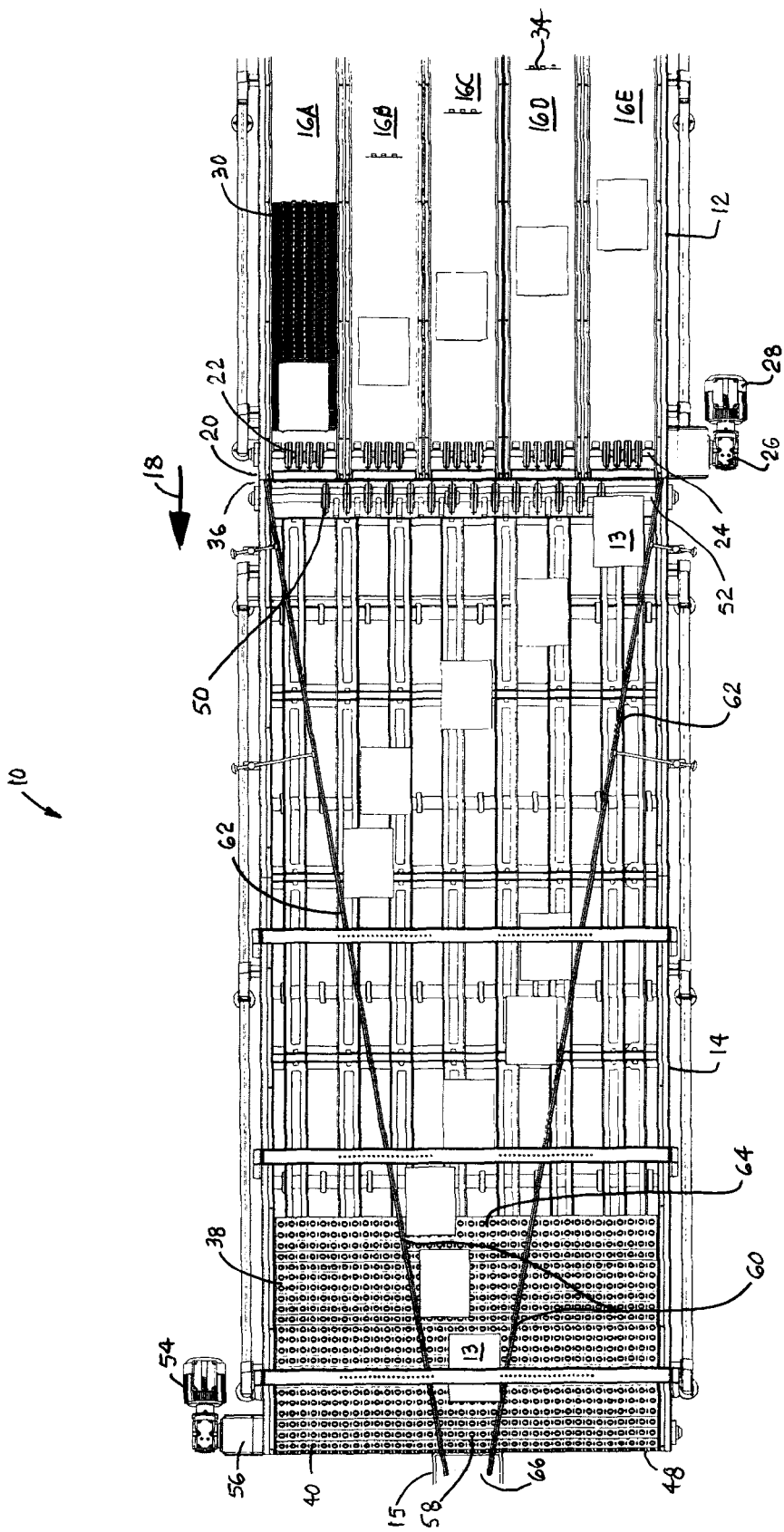
FIG. 2 is a top plan view of the merge conveyor of FIG. 1.
Figure 3:
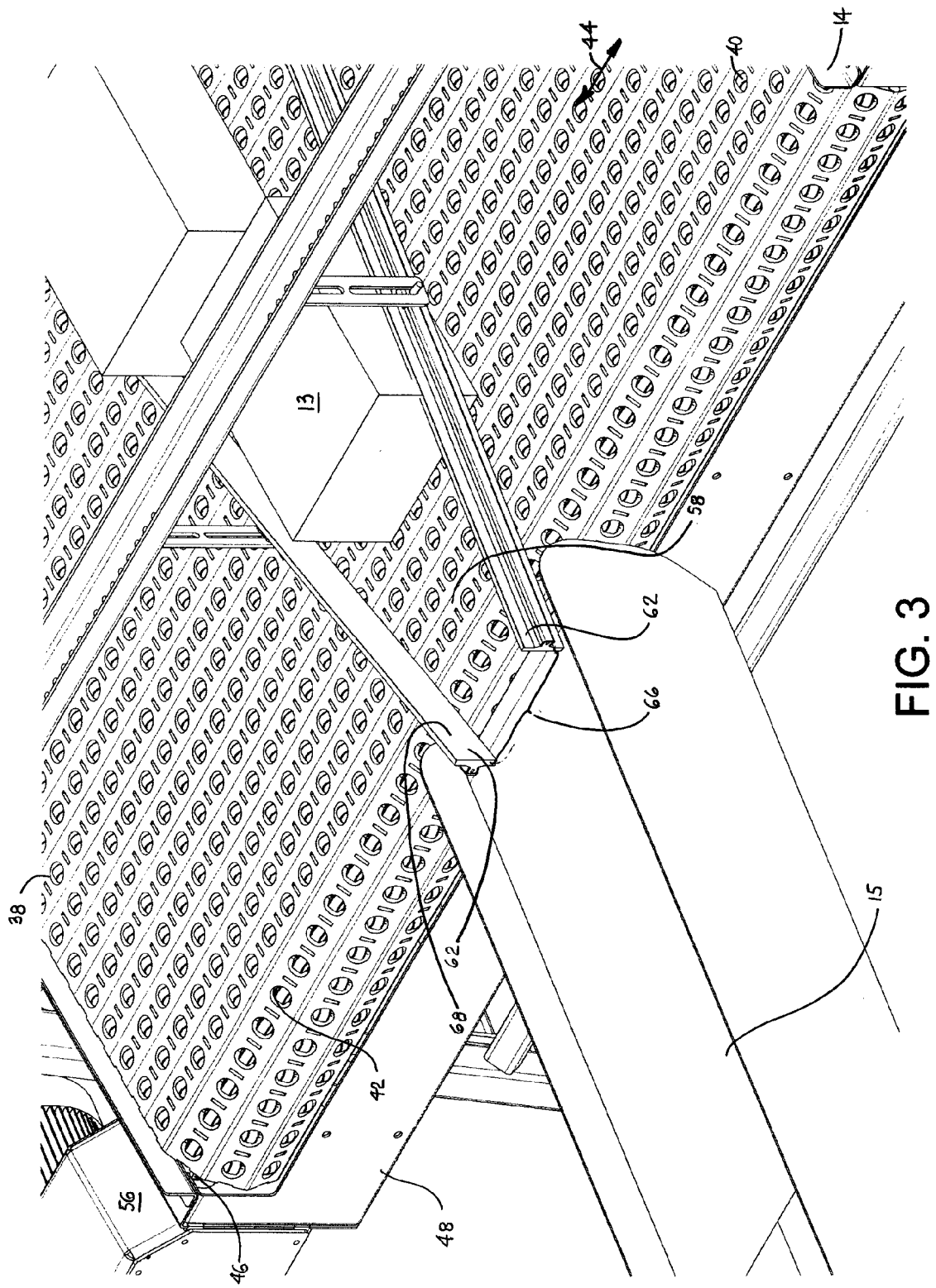
FIG. 3 is an enlarged view of the exit end of the merge conveyor of FIG. 1.

FIGS. 1-3 show a merge conveyor embodying features of the invention. (Portions of the conveyor belt in each conveyor are removed in FIGS. 1 and 2 to reveal further details of the conveyors.) The merge conveyor 10 comprises an upstream timing conveyor 12 feeding articles 13 to a singulating conveyor 14, which arranges them in single file for delivery to an outfeed conveyor 15.

The timing conveyor in this example is a multilane conveyor having five individual timing conveyor belts 16A-E arranged side by side to advance in parallel in a conveying direction 18 toward a downstream end 20. The belts are trained around drive sprockets 22 mounted on a common drive shaft 24 at the downstream end and similar idle sprockets and shafts at the opposite end. The drive shaft is coupled via a gear box 26 to a motor 28 that drives the timing conveyor belt.

Each timing conveyor belt 16 has a plurality of rollers 30 extending through the thickness of the belt and mounted on axles perpendicular to the conveying direction. A bearing surface 32 underlying each timing conveyor belt supports the belt from below and provides a surface on which rollers can ride to rotate and accelerate articles atop them in the conveying direction as the belt advances. The bearing surface may be a pan, as shown, parallel wear strips, or even a flat conveyor belt that may be driven in or opposite to the conveying direction to cause the rollers to rotate forward or reverse in the conveying direction.

The timing conveyor belt is also equipped with positioning elements, such as pop-up flights 34 that pop up to a blocking position upon contacting an actuating surface beneath the belt. An article conveyed atop the rollers of a timing conveyor belt is accelerated in the conveying direction until it is stopped by a raised flight, which marks a designated position on the belt. The flights are staggered at selected intervals in the conveying direction from lane to lane to ensure that articles exit the timing conveyor 12 at precise, different times. In this preferred version, the rollers in each lane, i.e., in each timing conveyor belt 16A-E, accelerate the articles forward against the flights so that the articles may be fed at known intervals onto the singulating conveyor 12. One example of a timing conveyor belt that may be used in the invention is described in U.S. Pat. No. 7,426,992, "Systems and Methods for Providing an Improved Timing Conveyor," issued Sep. 23, 2008, to Matthew L. Fourney. The disclosure of that patent is incorporated into this disclosure by reference.

The downstream end 20 of the timing conveyor 12 abuts the singulating conveyor 14 at an upstream end 36. The singulating conveyor includes a transverse-roller conveyor belt 38 having rollers 40 arranged to rotate in a transverse direction 44 to the conveying direction 18 on axles 42 parallel to the conveying direction. The singulating conveyor belt is trained around drive sprockets (not shown) mounted on the drive shaft 46 at an exit end 48 of the singulating conveyor and idle sprockets 50 on an idle shaft 52 at the upstream end 36. A motor 54 coupled to the drive shaft via a gear box 56 drives the belt in the conveying direction 18.

Articles received on the singulating conveyor are funneled toward a narrow region 48 of the belt by a plow 60, which comprises a pair of guide rails 62 angled toward each other across a narrowing-width region 64 of the singulating belt 14. The converging guide rails define a triangular region having an opening 66 at the exit. The staggered articles fed by the timing conveyor onto the singulating belt are confined by the plow to the triangular narrowing-width region. Articles from the outermost lanes 16A and 16 E first encounter the plow near the upstream end of the singulating conveyor. Articles from the next inner lanes 16B and 16 D first encounter the plow further downstream. And articles from the center lane 16C, aligned with the opening 66 to the outfeed conveyor 15, proceed to the opening at the exit without even contacting the plow.

The transverse rollers 40 in the belt facilitate the action of the plow in guiding the articles transversely across the conveyor. The contact surface 68 of the plow is preferably made of a material, such as UHMW, having a low coefficient of friction.

Figure 4A:
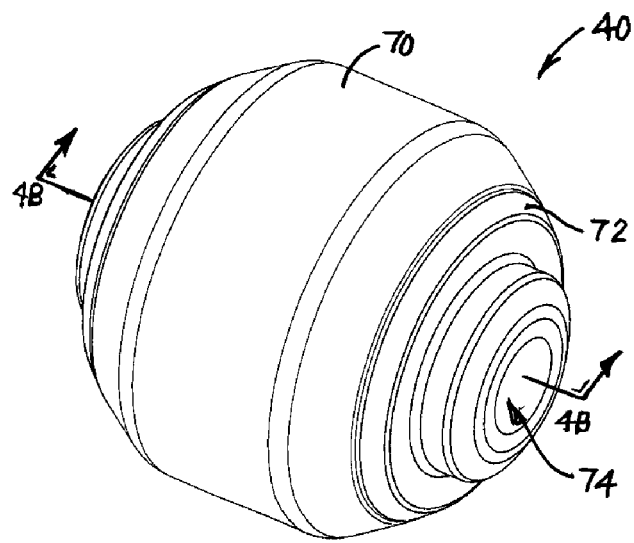
FIGS. 4A and 4B are isometric and cross sectional views of the rollers in the transverse-roller singulating belt of FIG. 1.
Figure 4B:
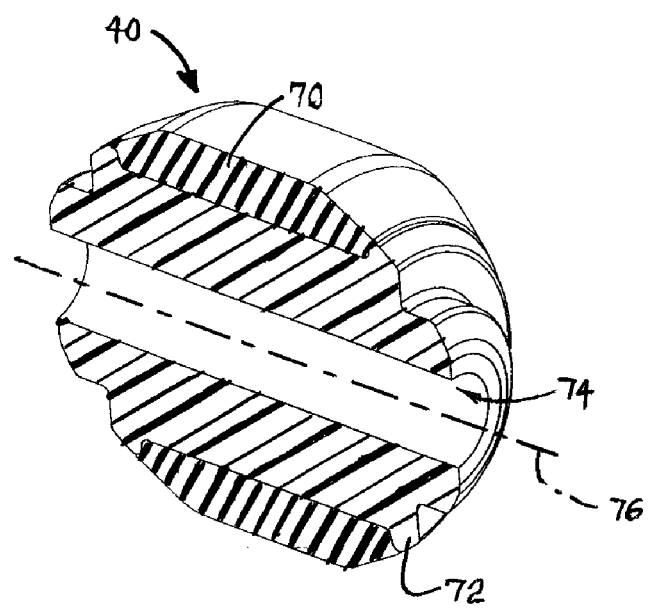

To further inhibit the articles from moving backwards slightly by contact with the plow, the belt rollers 40 have a high-friction rubber or elastomeric peripheral surface 70 as shown in FIGS. 4A and 4B, molded or otherwise affixed around the roller body 72, which may be molded out of a lower-friction plastic material. (A thermoplastic elastomeric material having a hardness of about 35 shore D is one example of a high-friction material.) A bore 74 through the roller body receives the axle 42 and defines an axis of rotation 76 for the roller parallel to the conveying direction. Unlike the in-line rollers in the timing conveyor belts, the transverse rollers in the singulating belt do not ride on bearing surfaces. Instead, they are free to rotate as dictated by forces applied to the articles by the plow. The low friction between the axle and the bore allows the roller to rotate freely in the transverse direction 44 as a supported article is pushed by the plow. The high-friction peripheral surface of the roller prevents the article from sliding along the roller in the conveying direction and, consequently, maintains the timing relationship established by the timing conveyor. Maintaining the timing prevents collisions between articles on the singulating conveyor and allows the belts to be operated at high speeds for high throughput without jams. The high-friction roller surfaces also inhibit the tendency of the articles to rotate about a vertical axis, or re-orient, on contact with the plow's guide rail. Thus, the timing conveyor and the high-friction transverse-roller belt with plow cooperate to make an effective merge conveyor.

Although the invention has been described in detail with reference to a preferred version, other versions are possible. For example, the plow could consist of a single guide rail across the singulating conveyor section of the merge conveyor. As another example, the timing conveyor could be realized as a single belt divided into multiple lanes or by multiple belts that are not necessarily geometrically parallel. So, as these few examples suggest, the scope of the claims is not meant to be limited to the details of the preferred version described by way of example.

What is claimed is:

1. A merge conveyor comprising:
    a multilane timing conveyor having a plurality of lanes conveying articles to a downstream end in a conveying direction, wherein the timing conveyor staggers the articles in the conveying direction from lane to lane to feed the articles off the downstream end at different times;
    a conveyor belt advancing in the conveying direction toward an exit end from an opposite upstream end adjacent the downstream end of the timing conveyor to receive articles from the timing conveyor, the conveyor belt having a plurality of article-supporting rollers arranged to rotate freely in a direction transverse to the conveying direction;
    a plow arranged with the conveyor belt to funnel articles received from the timing conveyor through a narrowing-width region of the conveyor belt to the exit end;
    wherein the rollers have a high-friction peripheral surface contacting conveyed articles to resist movement of the articles along the rollers parallel to the conveying direction while the rollers supporting an article engaging the plow rotate to push the article in the transverse direction as the conveyor belt advances.

2. A merge conveyor as in claim 1 wherein the high-friction peripheral surface is made of rubber or an elastomeric material.

3. A merge conveyor as in claim 1 wherein the multilane timing conveyor comprises a plurality bearing surfaces and the lanes are formed by one or more roller belts arranged in parallel with periodically spaced positioning elements in each lane offset in the conveying direction from the positioning elements in the other lanes and having rollers that extend through the thickness of the roller belts to roll on the bearing surfaces underlying the roller belts as the rollers belts advances in the conveying direction to accelerate articles atop the rollers into the positioning elements.

4. A merge conveyor as in claim 1 wherein the plow is arranged to confine conveyed articles to a generally triangular region of the conveyor belt.

5. A merge conveyor as in claim 1 wherein the plow is arranged to confine conveyed articles to a width across the conveyor belt at the exit end narrow enough to admit only one article at a time.

6. A merge conveyor as in claim 1 wherein the plow includes a pair of guides separated across the width of the conveyor belt by a distance that decreases toward the exit end.

* * * * *